No. 888,953. PATENTED MAY 26, 1908.
D. P. ZONDERVAN.
DISH DRAINER.
APPLICATION FILED MAR. 1, 1907.

Witnesses: Inventor: Dow P. Zondervan,
By Thomas G. Orwig, Attorney.

UNITED STATES PATENT OFFICE.

DOW P. ZONDERVAN, OF WINTERSET, IOWA.

DISH-DRAINER.

No. 888,953.      Specification of Letters Patent.      Patented May 26, 1908.

Application filed March 1, 1907. Serial No. 360,606.

*To all whom it may concern:*

Be it known that I, Dow P. ZONDERVAN, a citizen of the United States, residing at Winterset, in the county of Madison and State of Iowa, have invented a new and useful Dish-Pan and Drainer Combined, of which the following is a specification.

My object is to provide an improved dish-pan and drainer with cup holders at the sides of the drainer and wires in the sides of the drainer and extended to serve as a support of simple and economic construction.

My invention consists in the structure as hereinafter set forth, pointed out in my claims and illustrated in the accompanying drawings, in which:—

Figure 1:
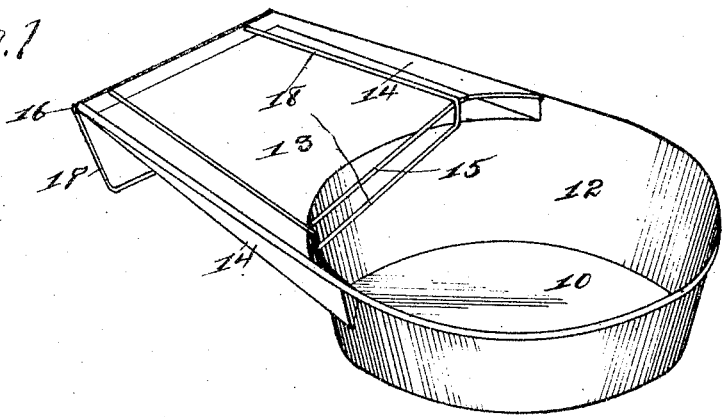
Figure 2:
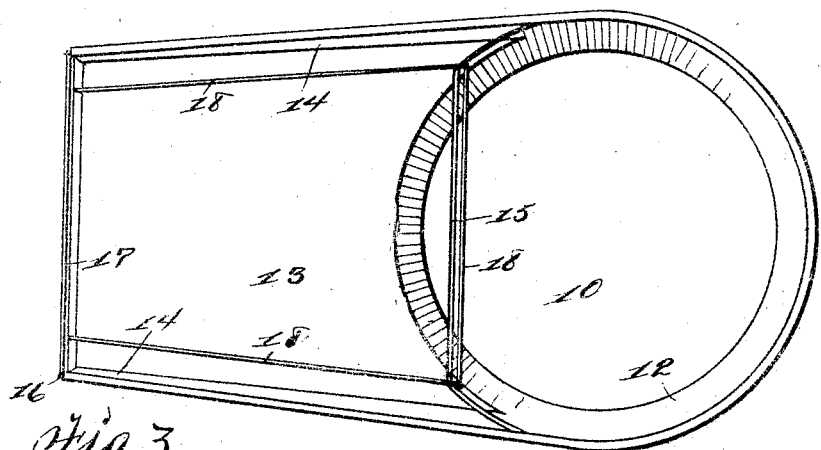

Figure 1 is a perspective view that shows the construction, arrangement and combination of all the parts. Fig. 2 is a top view and Fig. 3 a transverse sectional view of the pan and drainer. Dotted lines in Fig. 3 indicate that the inclination of the drainer relative to the pan may vary.

The numeral 10 designates the bottom and 12 the outwardly inclined upright portion of the pan which may vary in size as desired. A section of the top portion of the upright part is cut away as shown.

The flat and main portion 13, of the drainer projects laterally from near the top portion and side of the upright part 12 of the pan and its edges are turned up to produce the sides 14 of the drainer as shown and as required to prevent water from passing outward over the drainer. It is obvious the width and length of the drainer and its inclination relative to the pan may vary.

A wire 15 in the top edge of the pan extends across the pan and aids in producing a skeleton fender for preventing dishes placed on the drainer from slipping into the pan. A wire 16 fixed in the top edges of the sides 14 of the drainer is extended and bent downward to produce a foot 17 that aids in supporting the combined pan and drainer level on a table or other flat surface.

A third wire 18 is doubled and bent downward over the wire 15, as shown in Figs. 1 and 2 and connected with the wire 15 as shown, to aid in producing a skeleton fender as required for retaining dishes on the drainer, and the end portions of said wire are extended parallel with the sides 14 of the drainer and fastened and fixed to the end of the drainer in such a manner that cups and saucers and other small dishes can be advantageously placed and retained between the wires 18 and the sides 14 of the drainer while larger dishes are placed on the wide flat bottom of the drainer.

Figure 3:
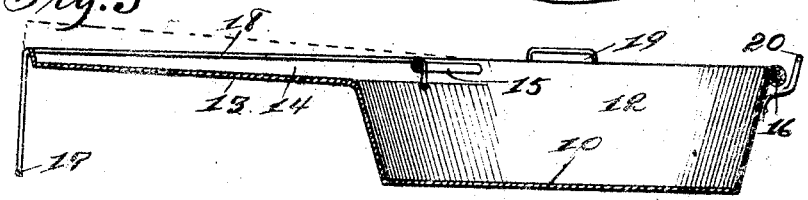

Handles 19 are fixed to the sides of the pan in a common way and a handle 20 is fixed to the pan at one end of the device, as shown in Fig. 3, so a person can seize it with one hand and the end of the drainer with the other hand as required to advantageously lift and carry the complete device when loaded with water and dishes.

Having thus set forth the purpose of my invention, its construction and manner of use, the practical advantages and utility thereof will be obvious.

What I claim as new and desire to secure by Letters-Patent, is:

A dish pan and drainer comprising a pan having a portion of its upright part cut away and a fixed wire in its top edge extended across over the inner end of a drainer, a drainer fixed to the pan, a wire doubled and bent downward over the wire in the top of the pan and its end fixed to the outer end of the drainer and a wire fixed in the tops of the parallel sides of the drainer and bent downward over the outer end of the drainer, to operate as set forth.

DOW P. ZONDERVAN.

Witnesses:
   G. W. SEEVERS,
   I. E. T. WILSON.